United States Patent
Sudhir et al.

(10) Patent No.: US 10,296,460 B2
(45) Date of Patent: May 21, 2019

(54) PREFETCH BANDWIDTH THROTTLING BY DYNAMICALLY ADJUSTING MISS BUFFER PREFETCH-DROPPING THRESHOLDS

(71) Applicant: Oracle International Corporation, Redwood Shores, CA (US)

(72) Inventors: Suraj Sudhir, Santa Clara, CA (US); Yuan C. Chou, Los Gatos, CA (US)

(73) Assignee: Oracle International Corporation, Redwood Shores, CA (US)

( * ) Notice: Subject to any disclaimer, the term of this patent is extended or adjusted under 35 U.S.C. 154(b) by 0 days.

(21) Appl. No.: 15/197,722

(22) Filed: Jun. 29, 2016

(65) Prior Publication Data
US 2018/0004670 A1    Jan. 4, 2018

(51) Int. Cl.
| | | |
|---|---|---|
| G06F 9/45 | (2006.01) | |
| G06F 12/08 | (2016.01) | |
| G06F 12/0808 | (2016.01) | |
| G06F 12/0815 | (2016.01) | |
| G06F 12/0862 | (2016.01) | |
| G06F 12/0875 | (2016.01) | |
| G06F 12/0897 | (2016.01) | |

(52) U.S. Cl.
CPC ...... *G06F 12/0862* (2013.01); *G06F 12/0875* (2013.01); *G06F 12/0897* (2013.01); *G06F 2212/1024* (2013.01); *G06F 2212/452* (2013.01); *G06F 2212/602* (2013.01)

(58) Field of Classification Search
CPC ............. G06F 12/0862; G06F 12/1027; G06F 12/0875; G06F 2212/452; G06F 9/30043; G06F 9/3836; G06F 3/0647; G06F 3/0656; G06F 3/067; G06F 7/483; G06F 9/30; G06F 9/3001; G06F 9/30018
USPC ............................................................ 711/1
See application file for complete search history.

(56) References Cited

U.S. PATENT DOCUMENTS

| | | | | |
|---|---|---|---|---|
| 6,782,410 | B1 * | 8/2004 | Bhagat .................. | G06F 9/5027 709/201 |
| 6,842,377 | B2 * | 1/2005 | Takano ................ | G11C 7/1021 365/185.21 |
| 7,017,011 | B2 * | 3/2006 | Lesmanne ........... | G06F 12/0813 711/141 |
| 7,196,942 | B2 * | 3/2007 | Khurana .............. | G11C 7/1051 326/38 |

(Continued)

*Primary Examiner* — Mohamed M Gebril
(74) *Attorney, Agent, or Firm* — Park, Vaughan, Fleming & Dowler LLP

(57) ABSTRACT

The disclosed embodiments relate to a method for controlling prefetching in a processor to prevent over-saturation of interfaces in the memory hierarchy of the processor. While the processor is executing, the method determines a bandwidth utilization of an interface from a cache in the processor to a lower level of the memory hierarchy. Next, the method selectively adjusts a prefetch-dropping high-water mark for occupancy of a miss buffer associated with the cache based on the determined bandwidth utilization, wherein the miss buffer stores entries for outstanding demand requests and prefetches that missed in the cache and are waiting for corresponding data to be returned from the lower level of the memory hierarchy, and wherein when the occupancy of the miss buffer exceeds the prefetch-dropping high-water mark, subsequent prefetches that cause a cache miss are dropped.

18 Claims, 6 Drawing Sheets

(56) References Cited

U.S. PATENT DOCUMENTS

| | | | | |
|---|---|---|---|---|
| 7,269,715 B2* | 9/2007 | Le | G06F 9/3802 | 712/215 |
| 7,321,955 B2* | 1/2008 | Ohmura | G06F 12/0804 | 711/113 |
| 7,512,736 B1* | 3/2009 | Overby | G06F 3/0607 | 707/999.202 |
| 8,230,193 B2* | 7/2012 | Klemm | G06F 3/0608 | 711/114 |
| 8,566,546 B1* | 10/2013 | Marshak | G06F 3/0604 | 711/112 |
| 8,990,527 B1* | 3/2015 | Linstead | G06F 3/0617 | 711/161 |
| 9,058,278 B2* | 6/2015 | Kalamatianos | G06F 12/0862 | |
| 2004/0068621 A1* | 4/2004 | Van Doren | G06F 9/52 | 711/144 |
| 2005/0125607 A1* | 6/2005 | Chefalas | G06F 12/0862 | 711/113 |
| 2006/0202999 A1* | 9/2006 | Thornton | G06F 12/145 | 345/531 |
| 2007/0005934 A1* | 1/2007 | Rotithor | G06F 12/0862 | 711/213 |
| 2007/0008328 A1* | 1/2007 | MacWilliams | G06F 12/0646 | 345/530 |
| 2009/0094413 A1* | 4/2009 | Lehr | G06F 3/0605 | 711/112 |
| 2009/0228648 A1* | 9/2009 | Wack | G06F 11/1092 | 711/114 |
| 2009/0282101 A1* | 11/2009 | Lim | G06F 9/5077 | 709/203 |
| 2010/0046267 A1* | 2/2010 | Yan | G11C 16/24 | 365/51 |
| 2010/0050016 A1* | 2/2010 | Franklin | G06F 11/0727 | 714/6.32 |
| 2010/0125712 A1* | 5/2010 | Murase | G06F 11/1458 | 711/162 |
| 2010/0241785 A1* | 9/2010 | Chen | G06F 9/5016 | 711/6 |
| 2010/0332780 A1* | 12/2010 | Furuya | G06F 3/0689 | 711/162 |
| 2011/0202735 A1* | 8/2011 | Kono | G06F 11/1451 | 711/162 |
| 2011/0239220 A1* | 9/2011 | Gibson | G06F 1/3206 | 718/103 |
| 2011/0307745 A1* | 12/2011 | McCune | G06F 17/30221 | 714/54 |
| 2012/0110293 A1* | 5/2012 | Yang | G06F 9/45558 | 711/170 |
| 2012/0198107 A1* | 8/2012 | McKean | G06F 13/18 | 710/40 |
| 2013/0007373 A1* | 1/2013 | Beckmann | G06F 12/126 | 711/136 |
| 2013/0067161 A1* | 3/2013 | Chandra | G06F 13/12 | 711/114 |
| 2013/0080805 A1* | 3/2013 | Vick | G06F 8/4432 | 713/320 |
| 2013/0111129 A1* | 5/2013 | Maki | G06F 3/0611 | 711/117 |
| 2013/0152097 A1* | 6/2013 | Boctor | G06F 9/505 | 718/103 |
| 2013/0326270 A1* | 12/2013 | Chen | G06F 11/2089 | 714/6.21 |
| 2014/0003114 A1* | 1/2014 | Pellizzer | H01L 27/2481 | 365/63 |
| 2016/0034400 A1* | 2/2016 | Dale | G06F 12/0862 | 711/122 |

\* cited by examiner

PREFETCH BANDWIDTH THROTTLING BY DYNAMICALLY ADJUSTING MISS BUFFER PREFETCH-DROPPING THRESHOLDS

BACKGROUND

Field

The disclosed embodiments generally relate to techniques for improving performance in computer systems. More specifically, the disclosed embodiments relate to the design of a processor, which dynamically controls prefetching to prevent over-saturation of interfaces in the memory hierarchy of a processor.

Related Art

Aggressive hardware- and software-based prefetching strategies have been increasingly used in microprocessors to achieve performance gains. Prefetching seeks to look ahead of the executing program and fetch required instructions and data into the processor's highest level caches before they are required. This obviates the processor waiting for the instructions and data to be obtained from a lower-level cache or from system memory, which can involve sizable delays of tens to several hundreds of clock cycles.

However, prefetching is not without negative side-effects that can worsen performance rather than improving it. One major problem is that aggressive prefetching can saturate the bandwidth of the interfaces between caches and memory, thereby delaying demand requests and adversely affecting system performance. Several techniques have been proposed to address this problem. Some of these techniques tackle the problem in a top-down manner by attempting to improve the accuracy of generated prefetches, so that only useful prefetches are sent. However, prefetches (especially hardware-generated ones) tend to be speculative. This is because a system typically cannot know in advance that a prefetch will be useful. Moreover, this type of approach is not cognizant of the bandwidth constraints of the interface to system memory and, therefore, may still saturate the interface. Other approaches attempt to tackle the problem in a bottom-up manner by setting bandwidth or miss-buffer-occupancy limits beyond which all prefetches are dropped. Still other approaches disable prefetching altogether when bandwidth becomes saturated. The above-described approaches are reasonably effective but are still sub-optimal because they lack fine-grained control of the bandwidth used by prefetches. In addition, turning a prefetcher on and off repeatedly may cause the prefetcher to generate less-accurate prefetches, which adversely affects system performance.

Hence, what is needed is a prefetching mechanism that effectively controls the problem of prefetches saturating memory interfaces without the above-described drawbacks of existing techniques to address this problem.

SUMMARY

The disclosed embodiments relate to a method for controlling prefetching in a processor to prevent over-saturation of interfaces in a memory hierarchy of the processor. While the processor is executing, the method determines a bandwidth utilization of an interface from a cache in the processor to a lower level of the memory hierarchy. Next, the method selectively adjusts a prefetch-dropping high-water mark for occupancy of a miss buffer associated with the cache based on the determined bandwidth utilization, wherein the miss buffer stores entries for outstanding demand requests and prefetches that missed in the cache and are waiting for corresponding data to be returned from the lower level of the memory hierarchy, and wherein when the occupancy of the miss buffer exceeds the prefetch-dropping high-water mark, subsequent prefetches that cause a cache miss are dropped.

In some embodiments, selectively adjusting the prefetch-dropping high-water mark based on the determined bandwidth utilization comprises: selecting a lower prefetch-dropping high-water mark when the determined bandwidth utilization indicates that the interface from the cache to the lower level of the memory hierarchy has become over-saturated; and selecting a higher prefetch-dropping high-water mark when the determined bandwidth utilization indicates that the interface from the cache to the lower level of the memory hierarchy has become unsaturated.

In some embodiments, determining the bandwidth utilization of the interface comprises determining an average latency involved in processing requests that missed in the cache over a preceding time period.

In some embodiments, determining the bandwidth utilization of the interface includes determining a number of requests that missed in the cache and were sent to the lower level of the memory hierarchy over a preceding time period.

In some embodiments, determining the bandwidth utilization of the interface includes: obtaining information from the lower level of the memory hierarchy about occupancy levels for input queues associated with the lower level of the memory hierarchy; and using the obtained occupancy information for the input queues associated with the lower level of the memory hierarchy to deduce the bandwidth utilization for the interface between the cache and the lower level of the memory hierarchy.

In some embodiments, the prefetch-dropping high-water mark is adjusted among more than two possible values.

In some embodiments, different prefetch-dropping high-water marks are associated with hardware prefetches and software prefetches.

In some embodiments, the prefetch-dropping high-water mark is adjusted based on bandwidth utilizations for one or more interfaces among different levels of the memory hierarchy.

In some embodiments, the lower level of the memory hierarchy comprises either: a lower level cache; or a system memory.

In some embodiments, the cache comprises one of: an L3 cache; an L2 cache; or an L1 cache.

DETAILED DESCRIPTION

Figure 1:
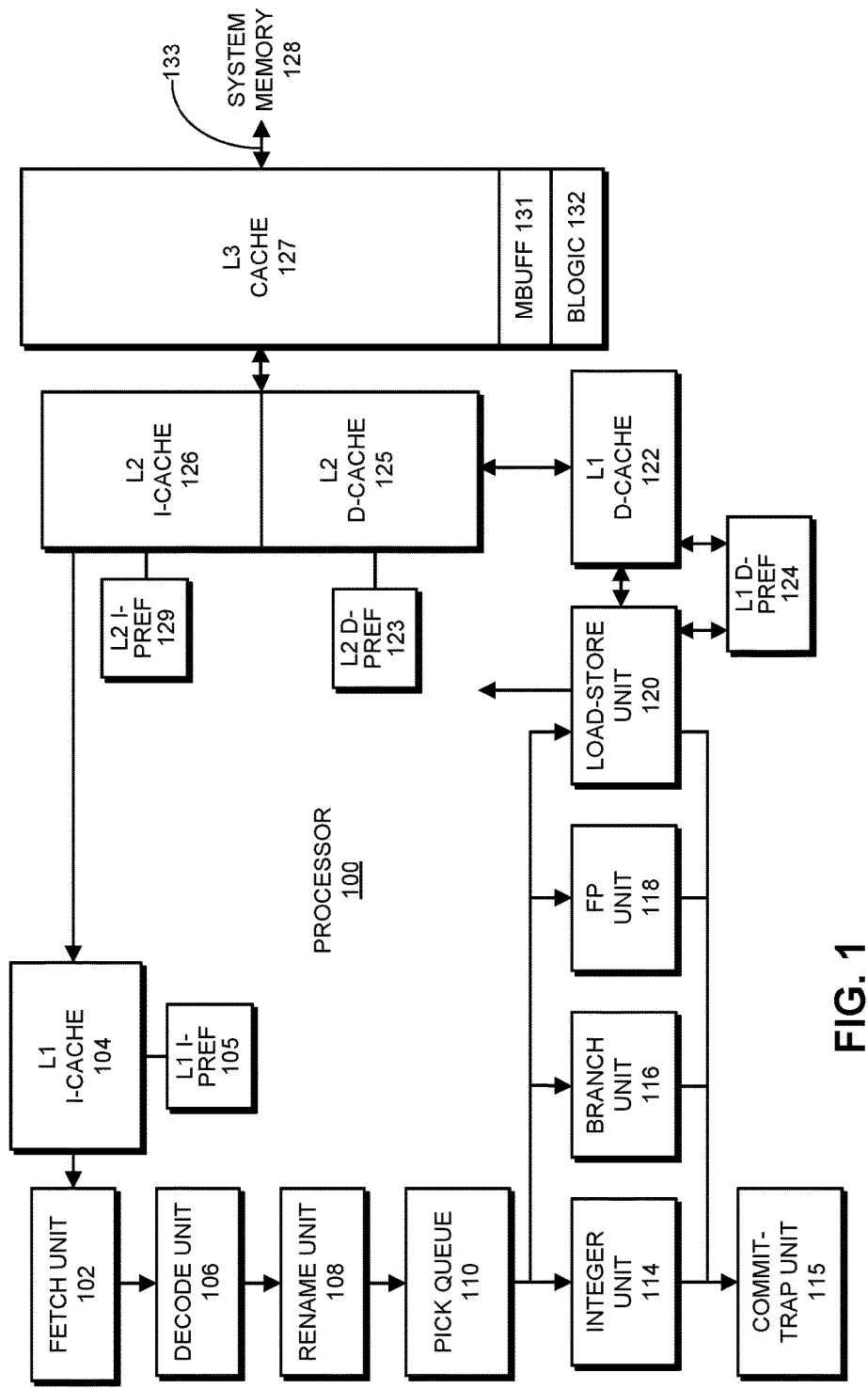
FIG. 1 illustrates a processor in accordance with disclosed embodiments.

The following description is presented to enable any person skilled in the art to make and use the present embodiments, and is provided in the context of a particular application and its requirements. Various modifications to the disclosed embodiments will be readily apparent to those skilled in the art, and the general principles defined herein may be applied to other embodiments and applications without departing from the spirit and scope of the present embodiments. Thus, the present embodiments are not limited to the embodiments shown, but are to be accorded the widest scope consistent with the principles and features disclosed herein.

The data structures and code described in this detailed description are typically stored on a computer-readable storage medium, which may be any device or medium that can store code and/or data for use by a computer system. The computer-readable storage medium includes, but is not limited to, volatile memory, non-volatile memory, magnetic and optical storage devices such as disk drives, magnetic tape, CDs (compact discs), DVDs (digital versatile discs or digital video discs), or other media capable of storing computer-readable media now known or later developed.

The methods and processes described in the detailed description section can be embodied as code and/or data, which can be stored in a computer-readable storage medium as described above. When a computer system reads and executes the code and/or data stored on the computer-readable storage medium, the computer system performs the methods and processes embodied as data structures and code and stored within the computer-readable storage medium. Furthermore, the methods and processes described below can be included in hardware modules. For example, the hardware modules can include, but are not limited to, application-specific integrated circuit (ASIC) chips, field-programmable gate arrays (FPGAs), and other programmable-logic devices now known or later developed. When the hardware modules are activated, the hardware modules perform the methods and processes included within the hardware modules.

Overview

In some existing processors, bandwidth throttling is accomplished by using a statically configured high-water mark for the miss buffers of caches in the memory hierarchy. The miss buffer of a cache has a fixed number of entries for storing outstanding demand requests and prefetches whose requested data could not be found in the cache and which are waiting for data to be returned for memory. When the miss buffer's occupancy reaches this statically configured high-water mark, subsequent prefetch requests are prevented from allocating in the miss buffer (i.e., they are dropped) until the miss buffer's occupancy falls below the high-water mark. This statically configured high-water mark setting is typically selected based on a preceding performance impact analysis of different high-water mark settings. However, the most ideal setting depends on the specific applications being run, and varies during execution of the applications, so a fixed setting cannot be optimal.

To overcome this problem, the disclosed embodiments continually measure the bandwidth utilization of the system memory interface and/or one or more cache interfaces at runtime and use this information to dynamically select the prefetch-dropping high-water mark for one or more caches in the memory hierarchy. When a high level of bandwidth utilization is detected, the prefetch-dropping high-water mark is lowered so that more prefetches are dropped. When a low level of bandwidth utilization is detected, the prefetch-dropping high-water mark is increased so that fewer prefetches are dropped.

In some embodiments, the bandwidth utilization of the system memory interface is deduced by measuring the latency of load requests that missed in the L3 cache over a specified time interval. If the latency of a load request that missed in the L3 cache exceeds a specified threshold, a first counter is incremented. Otherwise, a second counter is incremented. At the end of the time interval, if the value of the first counter is greater than the value of the second counter, the system memory interface is deemed to be over-saturated. This saturation information is used to select which one of two pre-programmed prefetch-dropping high-water marks will be used by the L3 miss buffer for the next time interval. Specifically, if the system memory interface is deemed to be over-saturated, the lower of the two high-water marks is selected. Otherwise, the higher of the two high-water marks is selected.

In some embodiments, the bandwidth utilization of the system memory is deduced at the L3 cache based on congestion at the system main memory. In this embodiment, when the system memory receives a request from the L3 cache, it examines the occupancies of one or more of its input queues. If the occupancies exceed specified thresholds, the system memory sets a bit in response to the requesting L3 cache. When the L3 cache subsequently detects that the bit is set, it increments a first counter. Otherwise, it increments a second counter. At the end of the time interval, if the value of the first counter is greater than the value of the second counter, the system memory interface is deemed to be over-saturated. This saturation information is used to select which one of two pre-programmed prefetch-dropping high-water marks will be used for the next time interval. Specifically, if the system memory interface is deemed to be over-saturated, the lower of the two high-water mark values is selected. Otherwise, the higher of the two high-water mark values is selected.

In some embodiments, the bandwidth utilization of the system memory interface is used by the L3 cache to select one of more than two prefetch-dropping high-water marks. This finer-grained selection of prefetch-dropping high-water mark values facilitates more precise control of how many prefetches are dropped in response to a given level of memory interface bandwidth utilization.

In some embodiments, there are separate prefetch-dropping high-water marks for different types of prefetches. Prefetches that were generated more accurately (such as software-generated prefetches) use a larger high-water mark value, while prefetches that are generated by less-accurate prefetchers (such as hardware-generated prefetches) use a lower high-water mark value.

In summary, the disclosed embodiments increase overall processor performance by allowing aggressive prefetchers to be used without negatively impacting performance by saturating the interfaces to lower-level caches and system memory regardless of what applications are running. The disclosed embodiments accomplish this by dynamically controlling the dropping of prefetches based on the level of memory interface utilization.

An exemplary system that implements this dynamic prefetch throttling technique is described in more detail below.

Computer System

FIG. 1 illustrates an exemplary computer system comprising a system memory 128 and a processor 100 in accordance with disclosed embodiments. Please note that the embodiment illustrated in FIG. 1 is an exemplary embodiment; the present invention is not meant to be limited to this embodiment. In general, the present invention can be applied to any computer system that includes one or more cache memories. Processor 100 can include any type of computing engine that can make use of prefetching instructions, including a processor that is part of: a server computer system, a desktop computer system, a laptop computer system, a tablet computer system, a smartphone or a device controller.

The system illustrated in FIG. 1 includes a memory hierarchy, which comprises a system memory 128 and various caches. More specifically, on the right side of FIG. 1, system memory 128 is coupled to level 3 (L3) cache 127, which can be incorporated into processor 100 or may be separate from processor 100. L3 cache 127 is coupled to level 2 instruction cache (L2 I-cache) 126 and level 2 data cache (L2 D-cache) 125. L2 I-cache 126 is coupled to level 1 instruction cache (L1 I-cache) 104, and L2 D-cache 125 is coupled to level 1 data cache (L1 D-cache) 122.

During operation of processor 100, instruction fetch unit 102 retrieves an instruction from L1 I-cache 104. This retrieved instruction feeds into a decode unit 106 and then into a register rename unit 108. Next, the instruction feeds into pick queue 110, where it waits to receive operands so it is ready to execute and is then sent to a functional unit for execution. These functional units include integer unit 114, branch unit 116, floating-point (FP) unit 118 and load-store unit 120. Note that load-store unit 120 moves operands between a register file and L1 D-cache 122. Load-store unit 120 is also coupled to a level 1 data prefetcher (L1 D-PREF) 124, which dynamically monitors data accesses and then selectively prefetches cache lines into L1 D-cache 122 based on detected data access patterns. Finally, after the instruction passes through one of the functional units, the instruction is routed through commit-trap unit 115, which commits the result of the instruction to the architectural state of the processor.

Note that in addition to L1 D-PREF 124, the system illustrated in FIG. 1 includes a number of other hardware prefetchers, such as level 1 instruction prefetcher (L1 I-PREF) 105, level 2 instruction prefetcher (L2 I-PREF) 129, and level 2 data prefetcher (L2 D-PREF) 123. Note that the multiple hardware prefetchers illustrated in FIG. 1 can potentially generate many more prefetches than a single prefetcher, and can consequently create a large amount of congestion in the various interfaces among different levels of the memory hierarchy. This additional congestion makes it more important for the system to be able to throttle prefetches that may be the cause of this congestion.

Also note that L3 cache 127 includes a miss buffer (MBUFF) 131 that stores entries for outstanding demand requests and prefetches that missed in L3 cache 127 and are waiting for corresponding data to be returned from system memory 128. (The term "demand request" refers to a non-speculative memory request that is required to process a program instruction that is presently being executed.

Demand requests do not include speculative requests, such as prefetches or memory requests made on behalf of speculative threads.) L3 cache 127 additionally includes measurement bandwidth-determination logic BLOGIC 132 that dynamically determines (or deduces) a bandwidth utilization for the interface 133 between L3 cache 127 and system memory 128. Note that in the embodiment illustrated in FIG. 1, only L3 cache 127 is illustrated as including a miss buffer 131 and bandwidth-determination logic 132. Hence, in the embodiment illustrated in FIG. 1, the prefetch bandwidth throttling mechanism only applies between L3 cache 127 and lower levels of the memory hierarchy. However, the present invention can also be applied to other caches, such as L2 I-cache, L2 D-cache 125, L1 I-cache, and L1 D-cache. In order to implement prefetch bandwidth throttling in other caches, the other caches need to include their own instances of miss buffer 131 and bandwidth-determination logic 132.

High-Water Marks

Figure 2A:
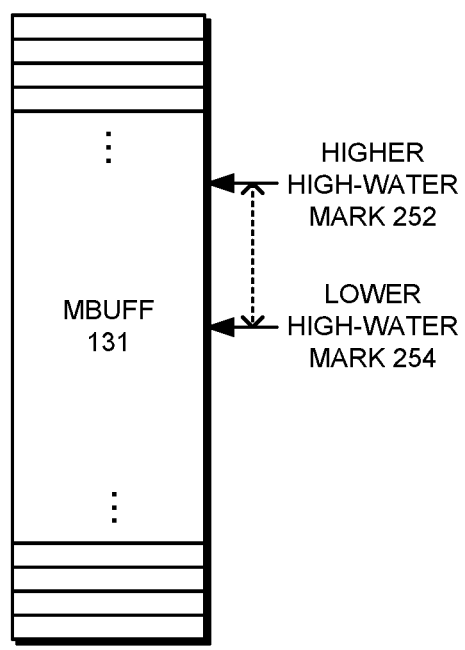
FIG. 2A illustrates a miss buffer with two prefetch-dropping high-water marks in accordance with the disclosed embodiments.

FIG. 2A illustrates exemplary high-water marks 252 and 254 with reference to the exemplary miss buffer 127. In an exemplary embodiment, if miss buffer 127 has 64 entries, then the lower high-water mark 254 may have a value of 32 entries, and the higher high-water mark 252 may have a value of 40 entries.

Process of Throttling Prefetches

Figure 2B:
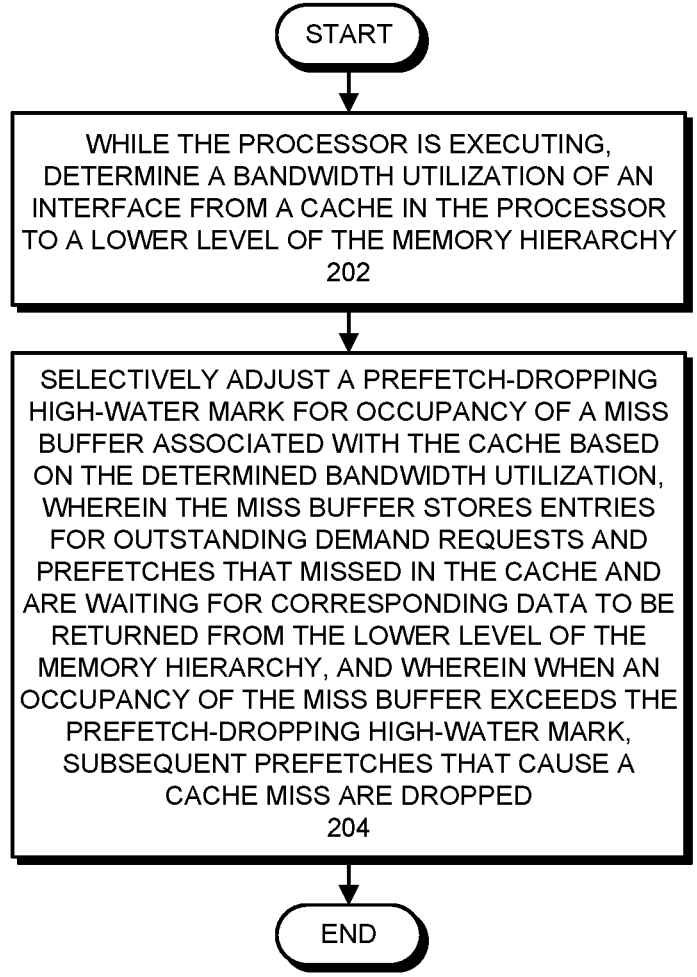
FIG. 2B presents a flow chart illustrating how a prefetch-dropping high-water mark is adjusted in accordance with the disclosed embodiments.

FIG. 2B presents a flow chart illustrating how a system that adjusts a prefetch-dropping high-water mark operates in accordance with the disclosed embodiments. While the processor is executing, the system determines the bandwidth utilization of an interface from a cache in the processor to a lower level of the memory hierarchy (step 202). Next, the system selectively adjusts a prefetch-dropping high-water mark for occupancy of a miss buffer associated with the cache based on the determined bandwidth utilization, wherein the miss buffer stores entries for outstanding demand requests and prefetches that missed in the cache and are waiting for corresponding data to be returned from the lower level of the memory hierarchy, and wherein when the occupancy of the miss buffer exceeds the prefetch-dropping high-water mark, subsequent prefetches that cause a cache miss are dropped (step 204).

Figure 2C:
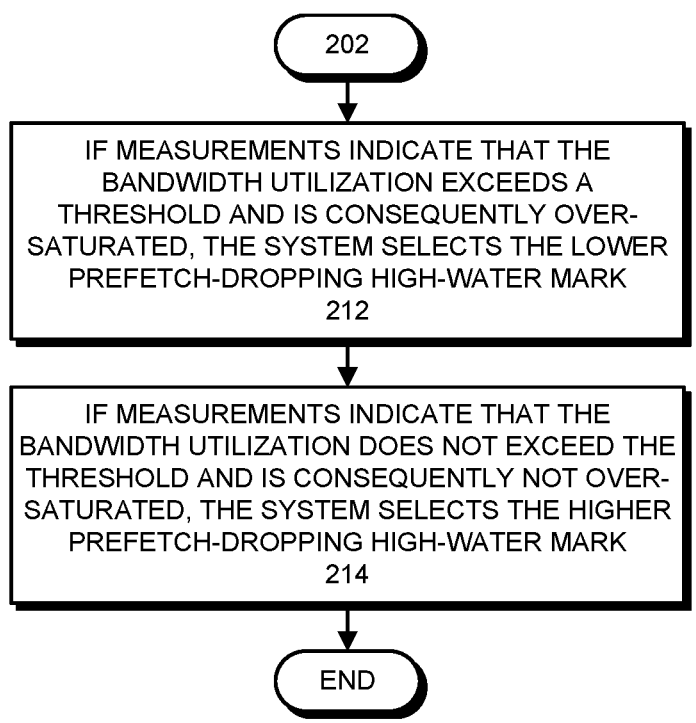
FIG. 2C presents a flow chart illustrating how a prefetch-dropping high-water mark is selected in accordance with the disclosed embodiments.

FIG. 2C presents a flow chart illustrating how a prefetch-dropping high-water mark is selected in accordance with the disclosed embodiments. (This flow chart illustrates in more detail the operations that take place in step 202 of the flow chart that appears in FIG. 2B.) As mentioned in the Overview section, during operation of the computer system, if measurements indicate that the bandwidth utilization of the interface between L3 cache 127 and system memory 128 exceeds a threshold (e.g., 80%) and is consequently oversaturated, the system selects the lower prefetch-dropping high-water mark 254 (step 212). On the other hand, if measurements indicate that the bandwidth utilization does not exceed the threshold, and is consequently not oversaturated, the system selects the higher prefetch-dropping high-water mark 252 (step 214). This process of taking bandwidth measurements and adjusting the prefetch-dropping high-water mark is continually repeated during operation of the computer system.

In some embodiments the system includes more than two prefetch-dropping high-water marks, and more than one bandwidth threshold value. In these embodiments, a specific prefetch-dropping high-water mark is selected based on a specific lowest bandwidth threshold value that has been exceeded.

Moreover, the bandwidth thresholds can also be determined in a number of different ways. For example, the bandwidth thresholds can be determined empirically based on trace-driven simulations for specific applications, and also for various mixes of specific applications. Alternatively, the bandwidth thresholds can be determined using probabilistic models (e.g., Markov models) for memory-access patterns associated with applications of interest.

Also, switching decisions for a specific high-water mark can be based on different thresholds depending on the direction the high-water mark is being changed. For example, the decision to select a lower high-water mark from a higher high-water mark can be based on whether the bandwidth utilization increases to 80% or above, whereas the decision to return back from the lower high-water mark to the higher high-water mark can be based on whether the bandwidth utilization decreases to 70% of lower. Note that the use of two different switching thresholds spaced a small distance apart reduces unnecessary oscillations between the higher and lower high-water marks in cases where the bandwidth utilization continually oscillates in the vicinity of a specific threshold value.

System

One or more of the preceding embodiments may be included in a system or device. More specifically, FIG. 3 illustrates a system 300 that includes: a processing subsystem 306 comprising one or more processors; a memory subsystem 308 comprising system memory; and a communication network 302.

Figure 3:
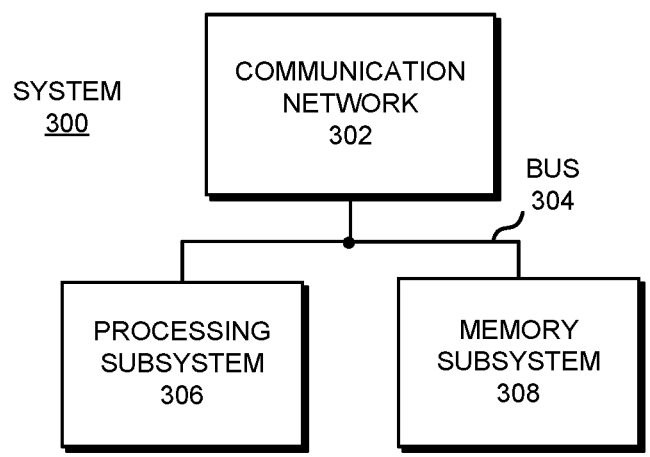
FIG. 3 illustrates a system, which includes a processor that performs prefetch throttling in accordance with an embodiment of the present disclosure.

Note that the components illustrated in FIG. 3 may be coupled by signal lines, links or buses, such as bus 304. These connections may include electrical, optical, or electro-optical communication of signals and/or data. Furthermore, in the preceding embodiments, some components are shown directly connected to one another, while others are shown connected via intermediate components. In each instance, the method of interconnection, or "coupling," establishes some desired communication between two or more circuit nodes, or terminals. Such coupling may often be accomplished using a number of photonic or circuit configurations, as will be understood by those of skill in the art; for example, photonic coupling, AC coupling and/or DC coupling may be used.

In some embodiments, functionality in these circuits, components and devices may be implemented in one or more: application-specific integrated circuits (ASICs), field-programmable gate arrays (FPGAs), and/or one or more digital signal processors (DSPs).

In general, components within system 300 may be implemented using a combination of hardware and/or software. Hence, the functionality in the preceding embodiments may be implemented more in hardware and less in software, or less in hardware and more in software, as is known in the art.

Thus, in addition to hardware components, system 300 may also include one or more software program modules or sets of instructions stored in a memory subsystem 308 (such as DRAM or another type of volatile or non-volatile computer-readable memory), which, during operation, may be executed by processing subsystem 306. Furthermore, instructions in the various modules in memory subsystem 308 may be implemented in: a high-level procedural language, an object-oriented programming language, and/or in an assembly or machine language. Note that the programming language may be compiled or interpreted, e.g., configurable or configured, to be executed by the processing subsystem.

Performance Results

This section summarizes simulated performance results collected by modeling an exemplary implementation of the prefetch bandwidth throttling mechanism using a cycle-accurate system simulator. Note that the simulated performance results illustrated in FIG. 4B are gathered for real-world commercial benchmarks. The simulated microprocessor in which the prefetch bandwidth throttling mechanism operates includes 12 cores, wherein each core contains 8 strands for a total of 96 strands. Moreover, the simulated microprocessor has a memory latency threshold of 530 cycles, and L3 high-water marks of 4 and 20 above and below threshold, respectively.

The baseline configuration used in the simulation disables the prefetch bandwidth throttling mechanism but enables everything else, including all hardware prefetchers, and the performance and bandwidth change figures are reported against the simulated results obtained from this baseline.

Figure 4A:
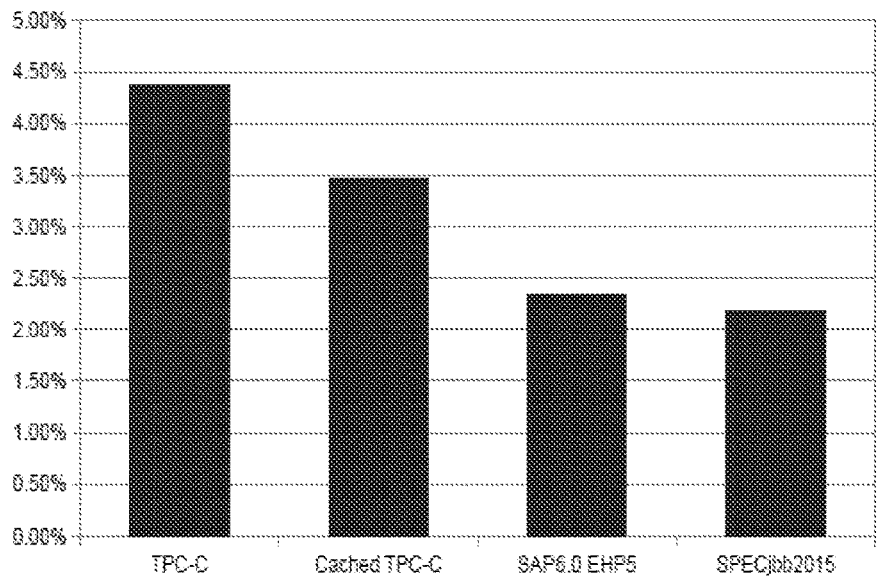
FIG. 4A presents performance gains for an exemplary implementation in accordance with the disclosed embodiments.
Figure 4B:
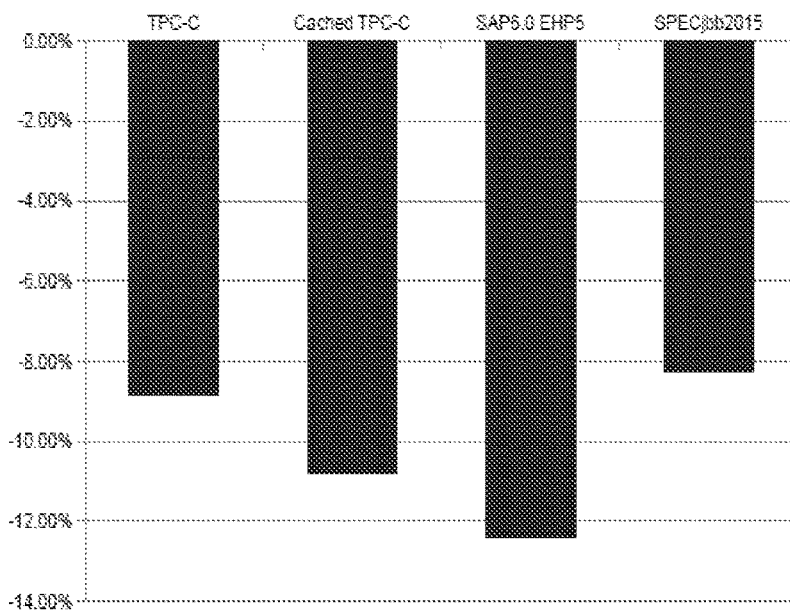
FIG. 4B presents a change in cache-to-memory bandwidth for an exemplary implementation in accordance with the disclosed embodiments.

FIG. 4B reports corresponding changes in lowest-level cache-to-memory bandwidth for both read and write operations for the simulations that produced the performance gains illustrated in FIG. 4A. Note that the results illustrated in FIGS. 4A and 4B are negative because the throttling mechanism reduces bandwidth consumption. Moreover, the disclosed system primarily targets a reduction in memory bandwidth consumption, with performance gains being an implied side effect. Note that this design, which uses a single threshold determined based on memory latency, yields a substantial reduction in memory bandwidth of between −8.2% and −12.5%, and a corresponding gain in performance ranging from 2.2% to 4.4%.

Also, the demonstrated reduction in bandwidth consumption generates opportunities for the designers to further improve system performance by taking advantage of the additional bandwidth headroom, along with the performance gains directly resulting from the reduction in bandwidth.

Various modifications to the disclosed embodiments will be readily apparent to those skilled in the art, and the general principles defined herein may be applied to other embodiments and applications without departing from the spirit and scope of the present invention. Thus, the present invention is not limited to the embodiments shown, but is to be accorded the widest scope consistent with the principles and features disclosed herein.

The foregoing descriptions of embodiments have been presented for purposes of illustration and description only. They are not intended to be exhaustive or to limit the present description to the forms disclosed. Accordingly, many modifications and variations will be apparent to practitioners skilled in the art. Additionally, the above disclosure is not intended to limit the present description. The scope of the present description is defined by the appended claims.

What is claimed is:

1. A method for controlling prefetching to prevent over-saturation of interfaces in a memory hierarchy of a processor, comprising:
   while the processor is executing, determining a bandwidth utilization of an interface from a cache in the processor to a lower level of the memory hierarchy; and
   selectively adjusting a prefetch-dropping high-water mark for occupancy of a miss buffer associated with the cache based on the determined bandwidth utilization by:
     selecting a lower prefetch-dropping high-water mark when the determined bandwidth utilization indicates that the interface from the cache to the lower level of the memory hierarchy has become over-saturated; and
     selecting a higher prefetch-dropping high-water mark when the determined bandwidth utilization indicates that the interface from the cache to the lower level of the memory hierarchy has become unsaturated;

wherein the prefetch-dropping high-water mark is selectively adjusted to provide different degrees of throttling prefetches generated by a prefetcher;

wherein the miss buffer stores entries for outstanding demand requests and prefetches that missed in the cache and are waiting for corresponding data to be returned from the lower level of the memory hierarchy, wherein the demand requests do not include prefetches; and wherein when an occupancy of the miss buffer exceeds the prefetch-dropping high-water mark, subsequent prefetches, generated by the prefetcher, that cause a cache miss are dropped, while subsequent demand requests are stored in the miss buffer.

2. The method of claim 1, wherein determining the bandwidth utilization of the interface comprises determining an average latency involved in processing requests that missed in the cache over a preceding time period.

3. The method of claim 1, wherein determining the bandwidth utilization of the interface includes determining a number of requests that missed in the cache and were sent to the lower level of the memory hierarchy over a preceding time period.

4. The method of claim 1, wherein determining the bandwidth utilization of the interface includes:
obtaining information from the lower level of the memory hierarchy about occupancy levels for input queues associated with the lower level of the memory hierarchy; and
using the obtained occupancy information for the input queues associated with the lower level of the memory hierarchy to deduce the bandwidth utilization for the interface between the cache and the lower level of the memory hierarchy.

5. The method of claim 1, wherein the prefetch-dropping high-water mark is adjusted among more than two possible values.

6. The method of claim 1, wherein each prefetch-dropping high-water mark is associated with a different type of prefetch; and wherein different types of prefetches include hardware prefetches and software prefetches.

7. The method of claim 1, wherein the prefetch-dropping high-water mark is adjusted based on bandwidth utilizations for one or more interfaces among different levels of the memory hierarchy.

8. The method of claim 1, wherein the lower level of the memory hierarchy comprises one of: a lower level cache; and a system memory.

9. The method of claim 1, wherein the cache comprises one of: an L3 cache; an L2 cache; and an L1 cache.

10. A processor with a mechanism that controls prefetching to prevent over-saturation of interfaces in a memory hierarchy of the processor, comprising:
a processor core;
a single or multilevel cache that is part of the memory hierarchy;
bandwidth-determination logic that determines a bandwidth utilization of an interface from the cache to a lower level of the memory hierarchy; and
a miss buffer associated with the cache that stores entries for outstanding demand requests and prefetches that missed in the cache and are waiting for corresponding data to be returned from the lower level of the memory hierarchy, wherein the demand requests do not include prefetches;

wherein the prefetch-dropping high-water mark is selectively adjusted to provide different degrees of throttling prefetches generated by a prefetcher;

wherein the miss buffer selectively adjusts a prefetch-dropping high-water mark for occupancy of the miss buffer based on the determined bandwidth utilization by:
selecting a lower prefetch-dropping high-water mark when the determined bandwidth utilization indicates that the interface from the cache to the lower level of the memory hierarchy has become over-saturated; and
selecting a higher prefetch-dropping high-water mark when the determined bandwidth utilization indicates that the interface from the cache to the lower level of the memory hierarchy has become unsaturated; and wherein when an occupancy of the miss buffer exceeds the prefetch-dropping high-water mark, subsequent prefetches, generated by the prefetcher, that cause a cache miss are dropped, while subsequent demand requests are stored in the miss buffer.

11. The processor of claim 10, wherein while determining the bandwidth utilization of the interface, the bandwidth-determination logic determines an average latency involved in processing requests that missed in the cache over a preceding time period.

12. The processor of claim 10, wherein while determining the bandwidth utilization of the interface, the bandwidth-determination logic determines a number of requests that missed in the cache and were sent to the lower level of the memory hierarchy over a preceding time period.

13. The processor of claim 10, wherein while determining the bandwidth utilization of the interface, the bandwidth-determination logic:
obtains information from the lower level of the memory hierarchy about occupancy levels for input queues associated with the lower level of the memory hierarchy; and
uses the obtained occupancy information for the input queues associated with the lower level of the memory hierarchy to deduce the bandwidth utilization for the interface between the cache and the lower level of the memory hierarchy.

14. The processor of claim 10, wherein the miss buffer adjusts the prefetch-dropping high-water mark among more than two possible values.

15. The processor of claim 10, wherein each prefetch-dropping high-water mark is associated with a different type of prefetch; and wherein different types of prefetches include hardware prefetches and software prefetches.

16. The processor of claim 10, wherein the miss buffer adjusts the prefetch-dropping high-water mark based on bandwidth utilizations for one or more interfaces among different levels of the memory hierarchy.

17. The processor of claim 10, wherein the cache comprises one of: an L3 cache; an L2 cache; and an L1 cache.

18. A computer system, comprising:
a processor; and
a memory hierarchy, which includes a cache hierarchy and a memory;
wherein the processor comprises,
a processor core,
the cache hierarchy that includes one or more caches;
bandwidth-determination logic that determines a bandwidth utilization of an interface from the cache to a lower level of the memory hierarchy, and a miss buffer associated with the cache that stores entries for outstanding demand requests and prefetches that missed in the cache and are waiting for corresponding data to be returned from the lower level of the memory hierarchy, wherein demand requests do not include prefetches, wherein the prefetch-dropping high-water mark is selectively adjusted to provide different degrees of throttling prefetches generated by a prefetcher;

wherein the miss buffer selectively adjusts a prefetch-dropping high-water mark for occupancy of the miss buffer based on the determined bandwidth utilization by:

selecting a lower prefetch-dropping high-water mark when the determined bandwidth utilization indicates that the interface from the cache to the lower level of the memory hierarchy has become over-saturated; and selecting a higher prefetch-dropping high-water mark when the determined bandwidth utilization indicates that the interface from the cache to the lower level of the memory hierarchy has become unsaturated, and wherein when an occupancy of the miss buffer exceeds the prefetch-dropping high-water mark, subsequent prefetches, generated by the prefetcher, that cause a cache miss are dropped, while subsequent demand requests are stored in the miss buffer.

\* \* \* \* \*